United States Patent
Fan

(10) Patent No.: US 10,901,140 B1
(45) Date of Patent: Jan. 26, 2021

(54) ILLUMINATION MODULE

(71) Applicant: Primax Electronics Ltd., Taipei (TW)

(72) Inventor: Shun-Biao Fan, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 16/885,653

(22) Filed: May 28, 2020

(30) Foreign Application Priority Data

Mar. 27, 2020 (CN) .......................... 2020 1 0227619

(51) Int. Cl.
*F21V 8/00* (2006.01)
(52) U.S. Cl.
CPC ........... *G02B 6/006* (2013.01); *G02B 6/0086* (2013.01)
(58) Field of Classification Search
CPC ............................... G02B 6/006; G02B 6/0086
See application file for complete search history.

(56) References Cited

FOREIGN PATENT DOCUMENTS

DE 1521992 * 9/2006 ....... G02F 1/133308

* cited by examiner

*Primary Examiner* — Donald L Raleigh
(74) *Attorney, Agent, or Firm* — Kirton McConkie; Evan R. Witt

(57) ABSTRACT

An illumination module includes a circuit board, a light-emitting element, a light guide plate and a casing. The light-emitting element is installed on the circuit board. The light-emitting element emits a light beam. The light guide plate is installed on the circuit board and located near the light-emitting element. The light beam is guided by the light guide plate. The circuit board, the light-emitting element and the light guide plate are covered by the casing. The casing includes a main body, a pattern part and a receiving recess. The receiving recess is located near the pattern part and exposed to a bottom surface of the main body. The light-emitting element is accommodated within the receiving recess.

10 Claims, 3 Drawing Sheets

ILLUMINATION MODULE

FIELD OF THE INVENTION

The present invention relates to an illumination module, and more particularly to an illumination module capable of showing a luminous pattern.

BACKGROUND OF THE INVENTION

Generally, a brand name text or a brand name pattern is printed on a casing of an electronic device for facilitating the consumers identification. Recently, the electronic device is equipped with an illumination module. The illumination module is disposed within the casing of the electronic device. Due to the illumination module, the brand name text or the brand name pattern shown on the casing is illuminated and thus a luminous effect is generated. Consequently, in the night or in a dark environment, the user can view the brand name text or the brand name pattern with the naked eyes. The installation position of the illumination module is not restricted to the casing of the electronic device. For example, the illumination module may be applied to a specified function key, e.g., a playback key of an audio device. The playback key has a playback pattern. When the playback key is pressed down, the illumination module within the playback key is enabled. Consequently, playback key, the playback pattern on the playback key is illuminated and the audio device plays the music. Whereas, if the playback key is not pressed down, the illumination module within the playback key is disabled and the playback pattern on the playback key is not illuminated.

A conventional method of installing the illumination module on the casing of the electronic device will be described as follows. Firstly, a transparent plastic material and a small amount of black pigment are molded as a locally-black semi-transparent casing, and a black pigment is sprayed on the backside of the casing. Then, a laser engraving operation is performed on the backside of the casing, and thus a required playback pattern is formed on the casing. Then, a light emitting diode (LED) and a circuit board are installed on the casing. When the light emitting diode emits a light beam and the light beam is projected to the playback pattern, the playback pattern is illuminated.

However, the above method still has some drawbacks. For example, when the light emitting diode is disabled and no light beam is generated, the trace of the playback pattern is still visible. Generally, the appearance is not aesthetically pleasing.

Therefore, there is a need of providing an illumination module with aesthetically pleasing appearance.

SUMMARY OF THE INVENTION

The present invention provides an illumination module with aesthetically pleasing appearance.

In accordance with an aspect of the present invention, an illumination module is provided. The illumination module includes a circuit board, a light-emitting element, a light guide plate and a casing. The light-emitting element is installed on the circuit board. The light-emitting element emits a light beam. The light guide plate is installed on the circuit board and located near the light-emitting element. The light beam is guided by the light guide plate, so that a direction of the light beam is changed. The circuit board, the light-emitting element and the light guide plate are covered by the casing. The casing includes a main body, a pattern part and a first receiving recess. The pattern part is located at the main body. The first receiving recess is located near the pattern part and exposed to a bottom surface of the main body. The light-emitting element is accommodated within the first receiving recess. When the light-emitting element emits the light beam, the light beam is guided by the light guide plate and projected to the pattern part, so that a luminous pattern corresponding to the pattern part is visible.

In accordance with another aspect of the present invention, an illumination module is provided. The illumination module includes a circuit board, a light-emitting element, a light guide plate and a casing. The light-emitting element is installed on the circuit board. The light-emitting element emits a light beam. The light guide plate is installed on the circuit board and located near the light-emitting element. The light beam is guided by the light guide plate, so that a direction of the light beam is changed. The circuit board, the light-emitting element and the light guide plate are covered by the casing. The casing includes a main body and a pattern part and a first receiving recess. The pattern part is located at the main body. The pattern part includes a first receiving recess. The first receiving recess is exposed to a bottom surface of the main body. The light guide plate is accommodated within the first receiving recess. When the light-emitting element emits the light beam, the light beam is guided by the light guide plate and projected to the pattern part, so that a luminous pattern corresponding to the pattern part is visible.

From the above descriptions, the present invention provides the illumination module. The pattern parts of the casing are transparent structures, and the main body of the casing is a dark plastic structure. Moreover, the main body and the pattern parts are produced by using a two-component injection molding process. The light-transmissible paint layer is coated on the casing and used as a protective film. Consequently, when the light-emitting elements are disabled and no light beams are generated, the pattern parts cannot be viewed by the user. The casing is equipped with the first receiving recesses for accommodating the corresponding light-emitting elements. The pattern part of the casing comprises the second receiving recess for accommodating the corresponding light guide plate. Consequently, the thickness of the illumination module is reduced, and the illumination module is suitably applied to the slim electronic device.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
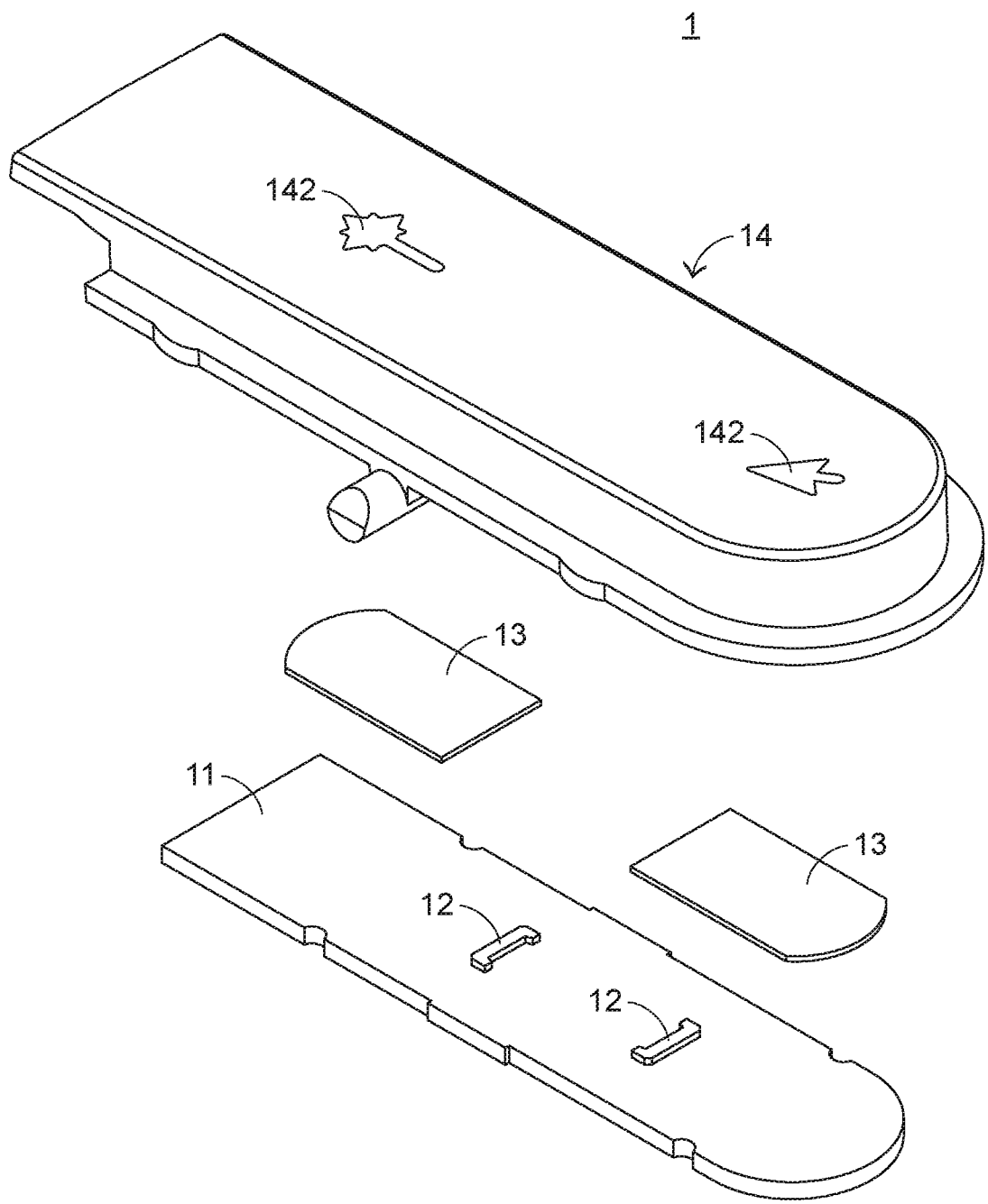
FIG. 1 is a schematic exploded view illustrating an illumination module according to an embodiment of the present invention.

For solving the drawbacks of the conventional technologies, the present invention provides an illumination module. The embodiments of present invention will be described more specifically with reference to the following drawings. For well understanding the present invention, the elements shown in the drawings are not in scale with the elements of the practical product. In the following embodiments and drawings, the elements irrelevant to the concepts of the present invention or the elements well known to those skilled in the art are omitted. It is noted that numerous modifications and alterations may be made while retaining the teachings of the invention.

Figure 2:
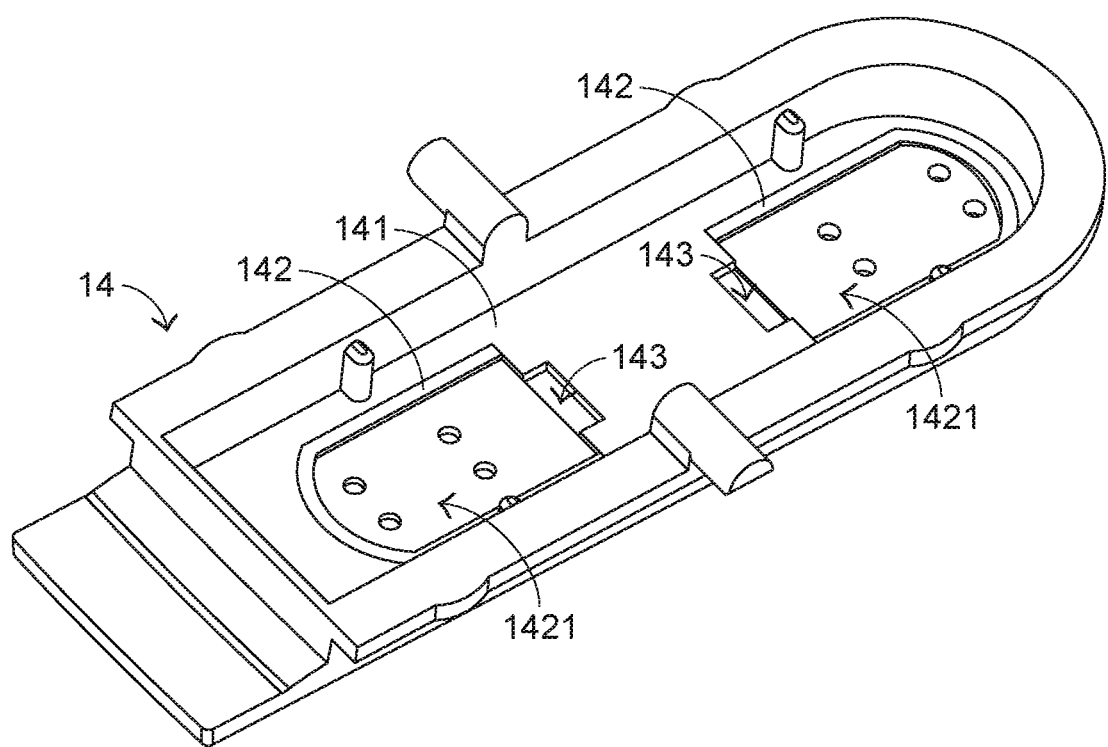
FIG. 2 is a schematic perspective view illustrating a casing of the illumination module as shown in FIG. 1 and taken along another viewpoint.

The structure of the illumination module of the present invention will be described as follows. FIG. 1 is a schematic exploded view illustrating an illumination module according to an embodiment of the present invention. FIG. 2 is a schematic perspective view illustrating a casing of the illumination module as shown in FIG. 1 and taken along another viewpoint. As shown in FIGS. 1 and 2, the illumination module 1 comprises a circuit board 11, plural light-emitting elements 12, plural light guide plates 13 and a casing 14.

The plural light-emitting elements 12 are installed on a top surface of the circuit board 11. When the light-emitting elements 12 are enabled, the light-emitting elements 12 emit light beams. The plural light guide plates 13 are aligned with the corresponding light-emitting elements 12, respectively. The plural light guide plates 13 are installed on the circuit board 11 and located near light-outputting parts of the corresponding light-emitting elements 12. When the light beams are introduced into the light guide plates 13, the light beams are guided by the light guide plates 13 and the directions of the light beams are changed. Consequently, the light beams are guided in the direction toward the casing 14.

The circuit board 11, the plural light-emitting elements 12 and the plural light guide plates 13 are covered by the casing 14. Moreover, the circuit board 11, the plural light-emitting elements 12 and the plural light guide plates 13 are attached on the casing 14 through double-sided adhesives. The casing 14 comprises a main body 141, plural pattern parts 142 and plural first receiving recesses 143. Each first receiving recess 143 is aligned with one light-emitting element 12 and one pattern part 142. Moreover, the first receiving recess 143 is located near the corresponding pattern part 142 and exposed to a bottom surface of the main body 141. Each light-emitting element 12 is accommodated within the corresponding first receiving recess 143. The plural pattern parts 142 are located at the main body 141. Each pattern part 142 comprises a second receiving recess 1421. Each second receiving recess 1421 is aligned with one light guide plate 13. The second receiving recesses 1421 are exposed to the bottom surfaces of the corresponding pattern parts 142. The light guide plates 13 are accommodated within the corresponding second receiving recesses 1421.

Preferably but not exclusively, the light-emitting elements 12 are micro light emitting diodes, and the circuit board 11 is a printed circuit board (PCB).

Figure 3:
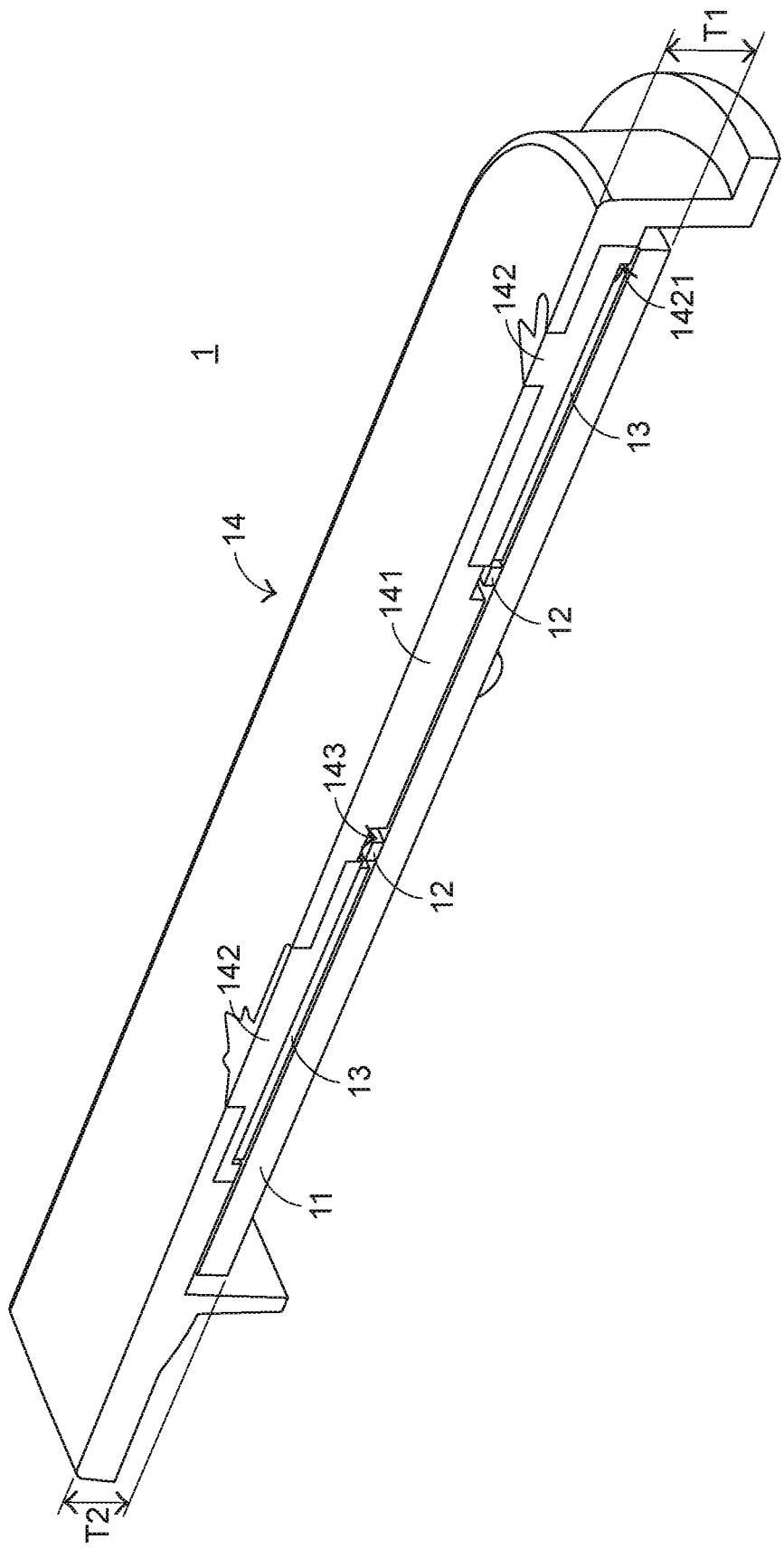
FIG. 3 is a schematic cutaway view illustrating the structure of the illumination module according to the embodiment of the present invention.

After the above components are combined together, the illumination module 1 is assembled. FIG. 3 is a schematic cutaway view illustrating the structure of the illumination module according to the embodiment of the present invention. After the light-emitting elements 12 emit the light beams, the light beams are guided by the corresponding light guide plates 13 and projected to the corresponding pattern parts 142. Consequently, the luminous patterns corresponding pattern parts 142 are illuminated.

The following four aspects should be specially described.

Firstly, the pattern parts 142 are transparent structures and formed on the casing 14, and the main body 141 is a dark (e.g., black) plastic structure. Moreover, the main body 141 and the pattern parts 142 are produced by using a two-component injection molding process.

Secondly, the casing 14 further comprises a light-transmissible paint layer (not shown). The light-transmissible paint layer is formed on a top surface of the main body 141 and used as a protective film (not shown). Since the pattern parts 142 are sheltered by the light-transmissible paint layer, the pattern parts 142 are not exposed outside the casing 14. Consequently, when the light-emitting elements 12 are disabled and no light beams are generated, the pattern parts 142 cannot be viewed by the user.

Thirdly, the arrangement of the first receiving recess 143 and the second receiving recesses 1421 are helpful to the miniaturization of the illumination module 1. For further reducing the volume of the illumination module 1, the illumination module 1 also has some additional designs. For example, the thickness of the protective film for covering the protective film is in the range between 8 and 15 millimeter, the thickness of the circuit board 11 is in the range between 0.3 and 0.8 millimeter, and the thickness of the light guide plate 13 is in the range between 0.2 and 0.3 millimeter.

Consequently, a first thickness T1 of the thickest region of the illumination module 1 is about 2.35 millimeter, and a second thickness T2 of the thinnest region of the illumination module 1 is about 1.95 millimeter. It is noted that the above thicknesses may be varied according to the practical requirements.

Fourthly, the light guide plate 13 is equipped with plural micro openings (not shown). The diameter of the micro opening is about 0.06 millimeter. Due to the micro openings, the light beams can be uniformly diffused without the light guide in plates 13.

From the above descriptions, the present invention provides the illumination module. The pattern parts of the casing are transparent structures, and the main body of the casing is a dark plastic structure. Moreover, the main body and the pattern parts are produced by using a two-component injection molding process. The light-transmissible paint layer is coated on the casing and used as a protective film. Consequently, when the light-emitting elements are disabled and no light beams are generated, the pattern parts cannot be viewed by the user. The casing is equipped with the first receiving recesses for accommodating the corresponding light-emitting elements. The pattern part of the casing comprises the second receiving recess for accommodating the corresponding light guide plate. Consequently, the thickness of the illumination module is reduced, and the illumination module is suitably applied to the slim electronic device.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:
1. An illumination module, comprising:
   a circuit board;
   a light-emitting element installed on the circuit board, and emitting a light beam;
   a light guide plate installed on the circuit board and located near the light-emitting element, wherein the light beam is guided by the light guide plate, so that a direction of the light beam is changed; and a casing, wherein the circuit board, the light-emitting element and the light guide plate are covered by the casing, and the casing comprises a main body, a pattern part and a first receiving recess, wherein the pattern part is located at the main body, the first receiving recess is located near the pattern part and exposed to a bottom surface of the main body, and the light-emitting element is accommodated within the first receiving recess, wherein when the light-emitting element emits the light beam, the light beam is guided by the light guide plate and projected to the pattern part, so that a luminous pattern corresponding to the pattern part is visible.

2. The illumination module according to claim 1, wherein the pattern part is a transparent structure and formed on the casing, and the main body is a plastic structure, wherein the main body and the pattern part are produced by using a two-component injection molding process.

3. The illumination module according to claim 1, wherein the pattern part comprises a second receiving recess, wherein the second receiving recess is exposed to a bottom surface of the pattern part, and the light guide plate is accommodated within the second receiving recess.

4. The illumination module according to claim 1, wherein the casing further comprises a protective film, and the protective film is formed on a top surface of the main body, wherein the pattern part is sheltered by the protective film, so that the pattern part is not exposed outside the casing.

5. The illumination module according to claim 4, wherein a thickness of the protective film is about 8~15 millimeters.

6. An illumination module, comprising:
a circuit board;
a light-emitting element installed on the circuit board, and emitting a light beam;
a light guide plate installed on the circuit board and located near the light-emitting element, wherein the light beam is guided by the light guide plate, so that a direction of the light beam is changed; and
a casing, wherein the circuit board, the light-emitting element and the light guide plate are covered by the casing, and the casing comprises a main body and a pattern part and a first receiving recess, wherein the pattern part is located at the main body, the pattern part comprises a first receiving recess, the first receiving recess is exposed to a bottom surface of the main body, and the light guide plate is accommodated within the first receiving recess, wherein when the light-emitting element emits the light beam, the light beam is guided by the light guide plate and projected to the pattern part, so that a luminous pattern corresponding to the pattern part is visible.

7. The illumination module according to claim 6, wherein the pattern part is a transparent structure and formed on the casing, and the main body is a plastic structure, wherein the main body and the pattern part are produced by using a two-component injection molding process.

8. The illumination module according to claim 6, wherein the casing further comprises a second receiving recess, wherein the second receiving recess is located near the pattern part and exposed to a bottom surface of the main body, and the light-emitting element is accommodated within the second receiving recess.

9. The illumination module according to claim 6, wherein the casing further comprises a protective film, and the protective film is formed on a top surface of the main body, wherein the pattern part is sheltered by the protective film, so that the pattern part is not exposed outside the casing.

10. The illumination module according to claim 9, wherein a thickness of the protective film is about 8~15 millimeters.

* * * * *